(12) United States Patent
Moore et al.

(10) Patent No.: US 6,310,601 B1
(45) Date of Patent: Oct. 30, 2001

(54) RESIZING IMAGES TO IMPROVE NETWORK THROUGHPUT

(75) Inventors: Victor S. Moore, Boynton Beach; Glen R. Walters, Sebring, both of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/076,390

(22) Filed: May 12, 1998

(51) Int. Cl.[7] .................................................. G09G 5/00
(52) U.S. Cl. ......................... 345/127; 345/342; 345/329
(58) Field of Search .................... 345/127, 131, 345/132, 342, 329, 332

(56) References Cited

U.S. PATENT DOCUMENTS

| | | | |
|---|---|---|---|
| 5,764,235 | * 6/1998 | Hunt et al. | 345/428 |
| 5,845,084 | * 12/1998 | Cordell et al. | 345/127 |
| 5,874,937 | * 2/1999 | Kesatoshi | 345/127 |
| 5,889,927 | * 3/1999 | Suzuki | 345/127 |
| 5,952,994 | * 9/1999 | Ong et al. | 345/127 |
| 5,960,126 | * 9/1999 | Nielsen et al. | 345/127 |

OTHER PUBLICATIONS

Dialog (R) File 275: Gale Group Computer DB (TM) Reichard, Kevin; Johnson, Eric F. Unix Review, V12, n13, P71(5), Dec. 1994.*

* cited by examiner

*Primary Examiner*—Richard Hjerpe
*Assistant Examiner*—Kimnhung Nguyen
(74) *Attorney, Agent, or Firm*—Fleit, Kain, Gibbons, Gutman & Bongini P.L.; Jon A. Gibbons

(57) ABSTRACT

A method to resize an image on a server comprising the steps of: hosting multimedia content on a server, wherein said server is coupled to one or more client systems capable of rendering multimedia content, wherein said multimedia content includes at least one image; receiving user requests to transmit user selected multimedia content; determining the display size directives of each image referenced on said user selected multimedia content; scaling said image referenced to the size specified in said multimedia content; and transmitting said user selected multimedia content with said image scaled to said size directive. A server for hosting multimedia content is electrically connected to one or more client systems for rendering multimedia content.

15 Claims, 5 Drawing Sheets http://www.uspto.gov/web/menu/memo4.html
— 203

205 —

General Information Page

An Introduction to the PTO
General PTO Reference, Directories, and Data Collections
Announcements, Notices, Press Releases, Transcripts, etc.
— 207

Patent Information        Trademark Information

RETURN TO THE USPTO HOME PAGE
— 201

Last Modified: 5 January 1998

RESIZING IMAGES TO IMPROVE NETWORK THROUGHPUT

CROSS-REFERENCE TO RELATED APPLICATIONS

Not applicable

BACKGROUND OF THE INVENTION

1. Field of the Invention

The present invention relates generally to computer networks and more particularly to methods and apparatus for enhancing the performance of displaying images on Internet browsers.

2. Description of the Related Art

The World-Wide-Web ("Web") has become immensely popular largely because of the ease of finding information and the user-friendliness of today's browsers. A feature known as hypertext allows a user to access information from one Web page to another Web page by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable running of applications that manipulate this content across a wide variety of different platforms.

The Web relies on an application protocol called HTML (Hyper Text Mark Up Language) which is an interpretative scripting language for rendering text, graphics, images, audio, and real-time video on a Web compliant browser. HTML is independent of client operating systems. So HTML renders the same content across a wide variety of software and hardware operating platforms. Software platforms include Windows 95, Windows NT, Copeland, AIX, Unix, and equivalent. Popular compliant Web-Browser includes Microsoft's Internet Explorer and Netscape Navigator.

HTML interprets links to files, images, sound clips, and video clips through the use of hypertext links. Upon user invocation of a hypertext link to a Web page, the browser initiates a network request to receive the desired Web page. The selected Web page is loaded according to its HTML script formatting. Typically any HTML page image is stored in its full size in the Web server. When a HTML Web page is selected by a user, the full size image is sent across the network along with the HTML page. The HTML scripting language provides position descriptors and size descriptors for each image to be loaded on the Web page. The client Web browser interprets these descriptors. Each image is placed in a position as specified by the position descriptor. Similarly, each image is scaled as specified by the corresponding size descriptor. It is common for the dimension specified by the size descriptor to scale the full image stored at the Web server to a smaller size. For example, a Web page designer may specify a thumbnail view of a full size image be displayed on a HTML page. Although, this system of placing and sizing the image at the client Web browser works well, it is not without costs. The scaling down or reduction of full size images by the client Web browser has two costs.

The first cost is the time required for the client Web browser to scale and display the image. Scaling images from the stored full size format to a smaller scaled format can take considerable time. Web pages containing several images can take 30 to 60 seconds to load. The user must wait until the image is completely loaded if they want to view the entire Web page. Therefore, a need exits to provide a faster method and apparatus for loading images for display on a HTML page.

The second cost is network congestion. Sending the entire full size image formats over a physically limited network link causes an increase in network congestion. Many times the full size image format is not required and only a smaller image size is specified by the HTML size descriptor. The client Web browser discards the unnecessary additional image content during the display of the reduced image size. The process of sending an entire full size image when only a small image size is specified is inefficient. Accordingly, a need exists for a method and apparatus to decrease network congestion for transmitting images for display on a HTML page.

Another problem with resizing images on a client Web browser is the limited availability of scaling algorithms. The most common method of reducing the size of an image is simply to discard image content through removal of pixels. For example, to reduce an image by a factor of ½, simply remove every other pixel in both the x and y direction of the image. This method requires little computation resources and can be implemented on a wide variety of client Web browser hardware platforms. The use of these simple discard methods does not produce the most desirable image results. Many other techniques such as sub-sampling and averaging adjacent pixels produce smaller image sizes with superior image qualities. The required computation resources to implement many of these more sophisticated image reduction algorithms can be large. Many slower and smaller Web browser client hardware platforms cannot implement these algorithms. Moreover, many of these Web browser client platforms may scale an image using different methods producing results that are not uniform across a variety of Web browser clients. Therefore, a need exists to provide more sophisticated image reduction algorithms that can deliver scaled images, uniformly, to a variety of Web browser clients, regardless of the hardware resources available at these clients.

SUMMARY OF THE INVENTION

Briefly, in accordance with the present invention, a method and apparatus is disclosed to resize an image. A server for hosting multimedia content is electrically connected to one or more client systems for rendering multimedia content. The multimedia content includes at least one image, a method to resize an image comprising the steps of: receiving user requests to transmit user selected multimedia content; determining the display size directives of each image referenced on the user selected multimedia content; scaling the image referenced to the size specified in the multimedia content; and transmitting the user selected multimedia content with the image scaled to the size directive.

BRIEF DESCRIPTION OF THE DRAWING(S)

FIG. 2 is a representative graphical user interface illustrating a Web browser displaying a Web page according to the present invention.

DESCRIPTION OF A PREFERRED EMBODIMENT

Figure 1:
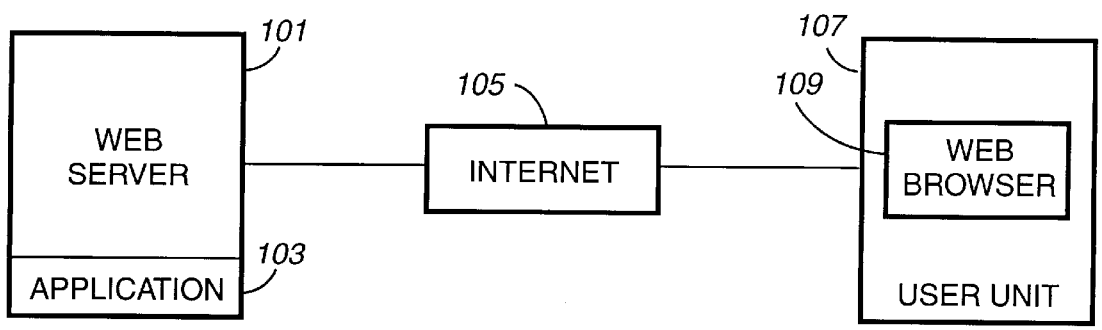
FIG. 1 is a functional block diagram of a typical data processing system for hosting Web pages in which the present invention is implemented.

FIG. 1 depicts a functional block diagram of a typical data processing system for hosting Web pages 100. A Web server 101 running a Web server and application 103. The Web server 101 is connected to the Internet 105. End-user data processing unit 107 with Web browser 109 are connected to the Internet 107. The Web browser 109 is any HTTP (Hyper-Text-Transfer-Protocol) compatible product such as Netscape Navigator, Sun Hot Java Browser, Microsoft Internet Explorer or equivalent. Web server 101 is a PC Server such as IBM's PC Server 330, IBM AS/400, IBM ES/9000 or equivalent server hardware platforms capable of hosting Web pages.

The application 103 is a Web page server application for hosting Web pages on the Web browser 109. The application 103 can be written in a variety of programming languages including C/C++, JAVA, Assembler and equivalent. The application 103 can be loaded from a computer readable medium such as 3½" diskettes or equivalent (not shown). It is important to point out that the precise operating systems and hardware configurations of the Web server 101, the end-user unit 107 and the Web-browser 109 are not limited to any specific hardware or software configuration. These systems can be implemented on a wide variety of hardware and software platforms.

FIG. 2 is a representative graphical user interface illustrating a Web browser displaying a Web page 200 according to the present invention. The Web page illustrated is from the U.S. Patent and Trademark Office at URL (Uniform Resource Locator) www.uspto.gov/web/menu/menu4.html 203. A banner 205 and hyper-link text 207 is also shown. An image 201 is depicted as a return button to the USPTO home page. The file for Image 201 is a GIF (Graphics Interchange Format) file, but any multimedia file format can be used. Web page 200 is created using HTML (Hyper Text Mark Up Language) which is an interpretative scripting language for rendering text, graphics, images, audio, and real-time video on a Web compliant browser. The word rendering is used to describe the process of playing multimedia content and may include any and all of the following: displaying text; displaying graphics; displaying pictures; and playing audio. HTML is independent of client operating systems. The HTML source code for rendering the file for image 201 is <IMG BORDER=0 SRC="/web/gifs/returnuspto.gif" ALT= "Return to the USPTO Home Page">. Each field within the HTML source code will now be discussed including the most popular optional fields.

To begin, all HTML commands are enclosed within pointy brackets in the format <command>. The use of bracket pair denotes the starting and stopping of a command. Generally, there are two types of commands that can be enclosed in the bracket pair <>. The first type of command is called an immediate command. This command instructs a Web browser to perform the function immediately or instantly. The second type of command is an inclusive command. The inclusive command instructs a Web browser to start something, and continue to do so until told to stop. The format of the inclusive commands begins with <command>, and ends with </command>. (Note that the slash is the first character of the stop command). Because both of these commands can control image files, both are within the true spirit and scope of this present invention. All HTML documents are stored as ASCII text. This insures readability across a large variety of all software and hardware platforms.

The HTML commands which cause an image to display are the focus of the present invention. The following is a summary of the command structure for the HTML IMG command.

| | |
|---|---|
| <IMG SRC="image name"> | An immediate command which will cause an image to be displayed on the screen. |

Additional options (separated from each other by a space):

| | |
|---|---|
| ALIGN=LEFT | Puts the image on the left of the available screen and allows text to wrap on the right. |
| ALIGN=RIGHT | Puts the image on the right of the available screen and allows text to wrap on the left. |
| BORDER=0 | Causes no border to be displayed around the image when the image is a link. |
| BORDER=1 | Causes a border to be displayed around the image when the image is a link. |
| HEIGHT=nn | This changes the height of the image to the number of pixels specified by 'nn'. The width of the image is not changed by this option. |
| WIDTH=nn | This changes the width of the image to the number of pixels specified by 'nn'. The height of the image is not changed by this option. |
| WIDTH=nn% | This changes the width of the image to occupy 'nn' percent of the available width of the screen. The height is also changed in proportion to the width. |
| ALT="text" | This text will be displayed on a text-only browser in place of the image, which cannot be displayed. |

Returning to the HTML code for image file 201, the HTML code is <IMG BORDER=0 SRC="/web/gifs/returnuspto.gif" ALT="Return to the USPTO Home Page">. The HTML string begins with <IMG which denotes an image file is to follow. The option border=0 causes no border around the image when the image is an HTML link to another Web page. Here no border is displayed for this image file as an HTML link back to the USPTO home page. The GIF file to be display as image file 201 is SRC="/web/gifs/returnuspto.gif." In the event a text only browser is being used, where the image 201 cannot be displayed, the option alt="Return to the USPTO Home Page" is invoked. The left > ends this HTML string. It should be noted that this is one of the most fundamental examples of displaying an image file. The exact size and dimensions of the image 201 are left to the particular Web browser 109 being used. The size and dimension may vary according to such factors such as the resolution of the computer graphics display used for Web browser 109. Other options, especially the use of options such as HEIGHT=nn (where nn is the number of pixels), WIDTH=nn (where nn is the number of pixels), WIDTH=nn % (where nn is the percentage of screen width 1–100%), will greatly alter the dimensions of the image 201 being displayed.

Figure 3:
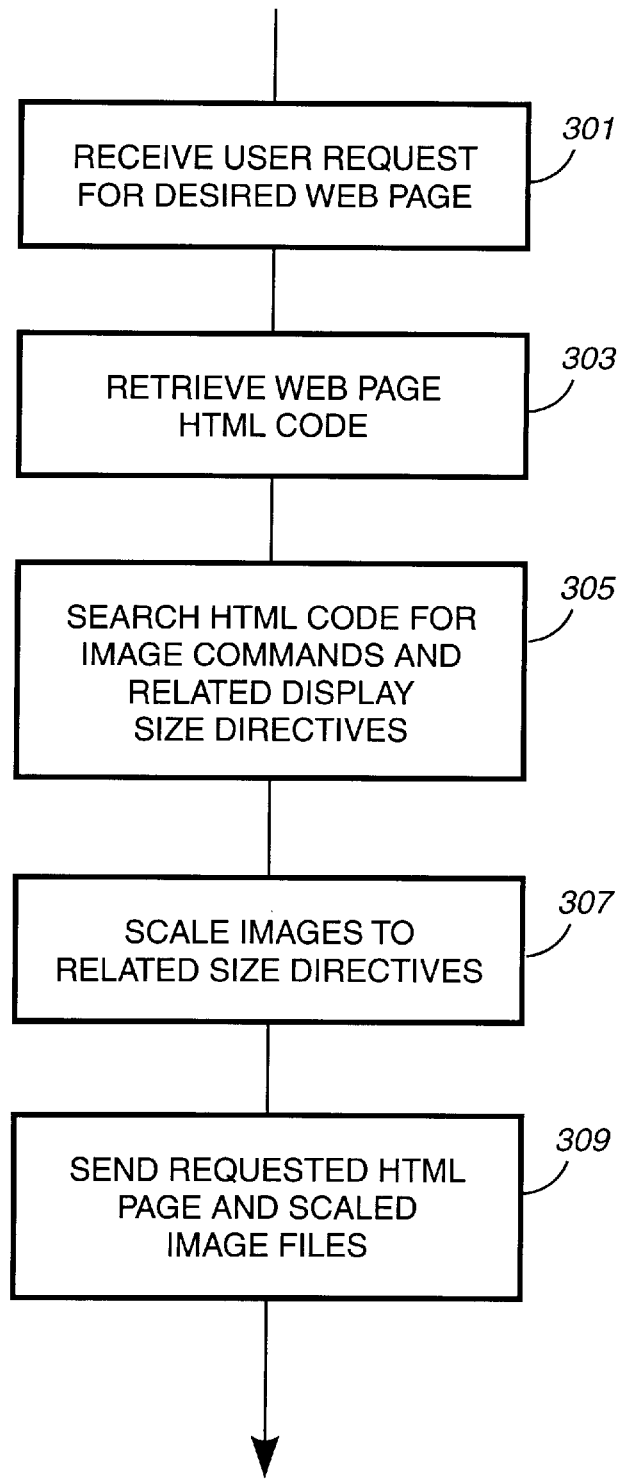
FIG. 3 is a flowchart of the present invention running on the Web server.

Referring now to FIG. 3, a flowchart 300 of the present invention running on the Web server 101. The process flow begins with a user selection 301. Using a pointing device such as a mouse or keyboard or combination of both, a user selects a desired Web page from a HTML link. Application 103 receives the requested Web page and retrieves the desired Web page 303. The process steps 301 and 303 of receiving a user request and retrieving a Web page is well known. There are several commercial products today that allow users to build per-defined or static Web pages for a Web server including products from Corel, IBM, Microsoft and Adobe. Other commercially available products allow the dynamic construction of Web pages on the Web page server at run time. Products that provide tools for the dynamic construction of HTML Web pages include Lotus Domino Server and IBM Net Commerce Server. These commercial products allow developers to build applications for constructing Web pages where the Web page data is filled-in during runtime. These products customize the HTML codes on the Web page according the data to be used. Either of these Web page construction methods, static or dynamic, can be used to construct Web pages for this present invention. The known process of dynamically creating HTML codes at runtime is extended to dynamically scale the image content referenced by the HTML code. The process of dynamically scaling image content is now described.

The application 103 searches the desired Web page for any images desired to be displayed, step 305. Searching an ASCII file for a keyword such as IMG= is well known. In addition the process step 305 looks for any related size directives such as HEIGHT=nn, WIDTH=nn, WIDTH=nn %. If a size directive is retrieved, the image file referenced by HTML tag IMG= is scaled according to the given directive, step 307. For example, if a given image file name is "image.gif" where size directives is height=300 and width = 400 would result in an HTML tag of <IMG HEIGHT=300 WIDTH=400 SRC="image.gif">. Application 103 would scale the image.gif file to 300 pixels high and 400 pixels wide. This scaled image file is then transmitted with the requested Web page to the user system, step 309. The process of transferring a HTML page to a user is well known. It should be appreciated that the scaling of an image on a Web server according to the image size directives will decrease the amount of image information transferred to a browser. The decreased can be substantial. For example, the typical computer screen running in VGA (Video Graphics Adapter) mode. In this mode the screen resolution is 640 pixels by 480 pixels by 8 bit color per pixel. This yields an image size of 2,457,600 bits (640×480×8 bits). A size descriptive of WIDTH=25% reduces the resulting image size to 153,600 (160×120×8 bits). The image size is reduced by a factor of $\frac{1}{16}$ ($0.25^2$) that is transferred to client Web browser 109. The decrease in information transferred results in less network utilization and less required network bandwidth. The decrease is more pronounced where the image is scaling directive is smaller. Moreover, many Web pages use multiple images. The scaling of multiple images per HTML Web page results in even a greater decrease of the overall Web page image content. Smaller Web page content moves faster through a network because less information is being transferred. In addition, it should be appreciated, that receiving an image already scaled to the proper size eliminates the need for the Web browser 109 to scale the image. The elimination of the Web browser scaling the image reduces the time it takes the Web browser to display the image. The cumulative effect of transferring only the amount of image information needed combined with the elimination of localized scaling by the Web browser produces a faster presentation of the requested Web page on the end-user unit 107.

The algorithm used to scale the image by application 103 on Web server 101 is typically a simple discard algorithm. For example, an image size descriptive WIDTH=25% (¼ size reduction), can scale a full size image by going stepping through the image in both the x (width) and y (height) direction and throwing out every other pixel, this would yield a size reduction of 50% or (½). The process can be repeated to reduce the image again by resulting in a 25% reduction of (½×½=¼). This algorithm is simple, works very fast with little computational resources, but does not handle reductions other by a factor of 2. Other known reduction algorithms to reduce an image includes sub-sampling a target region of pixels and averaging the result. Sophisticated image resizing capabilities. The GIF image format used by most Web pages compresses GIF images in a well-known manner that is more sophisticated then resizing by simple discarding. But still even more sophisticated algorithms and techniques exist that resize images with minimum loss of quality. Many of these more sophisticated algorithms are well known in the digital signal processing field and many others are proprietary such as those available from Open Computing Technologies, Ltd., Web Image line of products at online URL www.octI.com. The deployment of these algorithms on Web server 101 can be matched to the available computational resources available at Web server 101. The resulting resized or scaled images will be uniform across a variety of Web browser clients regardless of the computational resources available at each client.

Figure 4:
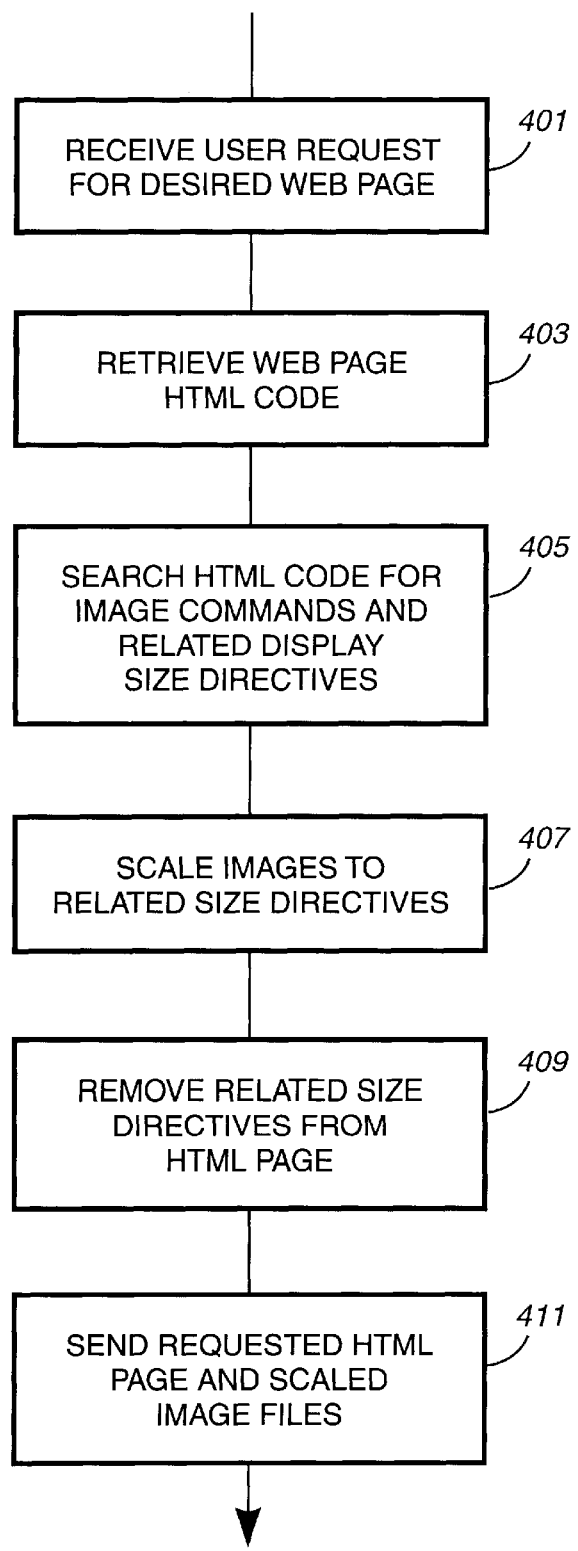
FIG. 4 is a flowchart of an alternate embodiment of FIG. 3 where the HTML size directives are removed.

FIG. 4 is a flowchart of an alternate embodiment of FIG. 3 where the HTML size directives are removed 400. Process steps 401, 403, 405 and 407 are identical to the process steps described above for FIG. 3. Step 409, removes the size directives such as HEIGHT=nn, WIDTH=nn, WIDTH=nn in the resulting HTML page. The process of removing known target strings in an ASCII string is well known. Most word-processing and E-mail programs have a find and replace command that can match strings with desired targets and replace the strings with other defined text, including replacing the strings with nothing. The process continues as described above, step 309, where the dynamically built Web page is sent to the user, step 411. The extra process step of removing all the directives, step 409, from the HTML page prior to transmission speeds up the display of the Web page on Web browser 109 since the size directives will make the resulting HTML page less complicated to render. Unlike the Web browser, the embodiment described for FIG. 3, here the Web browser does not have to even try to scale the image since the size descriptors are removed. Removing the Web browser step of trying to scale a previously scaled image will result in a quicker display of the Web page on end-user 107.

Figure 5:
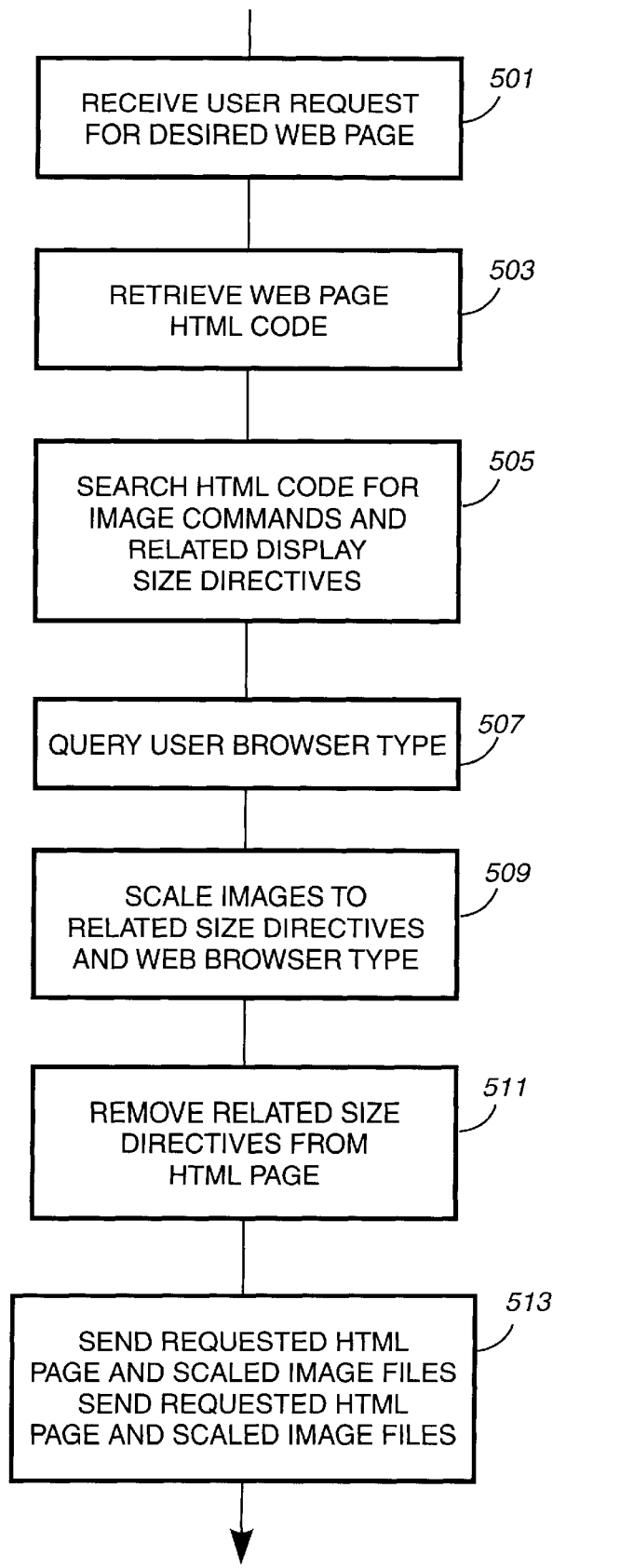
FIG. 5 is a flowchart of an alternate embodiment of FIG. 4 where the browser type is queried prior to displaying an HTML page.

FIG. 5 is a flowchart 500 of an alternate embodiment of FIG. 4 where the browser type is queried prior to displaying a HTML page. The process steps 501, 503, and 505 are the same as described for FIG. 3 steps 301 through 305. Step 507, the Web browser type is queried. An example HTML code sequence for querying Browser type is as follows:

```
<HTML>
    <META HTTP-EQUIV="Refresh" CONTENT="3;
    URL=nindex.html">
    <HEAD>
```

-continued

```
<TITLE>Detecting your browser . . . </TITLE>
</HEAD>
<BODY>
<H2>We're detecting your browser now . . . </H2>
If you're using Netscape or Microsoft Internet Explorer, the
enhanced version of this page will
automatically load. If not,
<A HREF="tindex.html"> CLICK HERE</A>
```

The HTML fragment, determines what mode to send the HTML Web page. If an enhanced page can be sent supporting the latest Web browser features such as JAVA and Frames, an enhanced page is built with the image size directives 509. If the enhanced features are not available on the user systems, a simplified version is built, step 509. As described above, the image size directive is removed, step 511 and the resulting Web page sent to the user, step 513.

It should be noted there are advantages to both methods as described in FIG. 4 of removing the HTML size directives and as described in FIG.3 of not removing the HTML size directives. The relative advantage of removing the HTML size directives in FIG. 4 is that the resulting HTML Web page is smaller. A smaller Web page can be transmitted faster over Internet 105 from Web Server 101 to Web Browser 107. On the other hand, the relative advantage of leaving the HTML size directives in place is that many newer versions of Web Browsers such as Netscape Navigator 3.0 make use of the HTML size directives for other purposes besides scaling images. Netscape Navigator 3.0 uses the size directives to layout the HTML Web page during rendering. This Netscape product reserves the image area on the constructed Web page and immediately loads frames and text while retrieving and scaling the images later on. The resulting effect of layout the page and rendering text before images are completed is that the Web browser user can read description of fields, buttons and text while the images finish loading. Moreover, the user many times perceives the Web page is loading faster if the text is made available prior to the completed display of the images.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method to resize an image on a server comprising the steps of:

hosting multimedia content on a server, wherein said server is coupled to one or more client systems capable of rendering multimedia content, wherein said multimedia content includes at least one image;

receiving user requests on to transmit user selected multimedia content;

searching on a server for one or more embedded HTML image tags including any related display size directives for each image referenced in said HTML image tag in said user selected multimedia content;

dynamically scaling said image on said server prior to transmission to said size specified in said one or more embedded HTML image tags, without the need to use any further information from said server or from said client systems or from an author of said multimedia system; and transmitting said user selected multimedia content with said image scaled to said size directive.

2. The method to resize an image of claim 1 further comprising the step of:

removing said size of each image referenced on said user selected Web page.

3. The method to resize an image of claim 1 wherein said step of searching on a server includes searching for an ASCII key word "img".

4. The method to resize an image of claim 3 wherein said step of searching on a server includes searching for one of one or more ASCII key words "width" or "height" or "src".

5. The method to resize an image of claim 4 wherein said step of dynamically scaling said image on said server to said size associated with at least one of said ASCII keywords "width".

6. A server for listing multimedia content electrically connected to one or more client systems for rendering multimedia content, wherein said multimedia content includes at least one image, said server to resize an image comprising:

a receiving means for receiving on a server, user requests to transmit user selected multimedia content;

a searching means for searching on said server for one or more embedded HTML image tags including any related display size directives for each image referenced in said HTML image tag in said user selected multimedia content;

scaling means for dynamically scaling said image on said server prior to transmission to the size specified in said one or more embedded HTML image tags, without the need to use any further information from said server or from said client systems or from an author of said multimedia system; and a transmitting means for transmitting said user selected multimedia content with said image scaled to said size directive.

7. The system to resize an image of claim 6 further comprising:

a removal means for removing said size of each image referenced on said user selected web page.

8. The system to resize an image of claim 6 wherein said searching means for searching on a server includes searching for an ASCII key word "img".

9. The system to resize an image of claim 8 wherein said searching means for searching on said server includes searching for searching for one of said ASCII key words "width" or "height" or "src".

10. The system to resize an image of claim 9 wherein said scaling means for dynamically scaling said image on said server to said size associated with at least one of said ASCII keywords "width" or "height".

11. A computer readable storage medium containing program instructions for resizing image on a server, said program instructions comprising instructions for:

hosting multimedia content on a server, wherein said server is coupled to one or more client systems capable of rendering multimedia content, wherein said multimedia content includes at least one image;

receiving user requests to transmit user selected multimedia content;

searching on said server one or more embedded HTML image tags including any related display size directives for each image referenced in said HTML image tag in said user selected multimedia content;

dynamically scaling said image referenced on said server prior to transmission to said size specified in said one or more embedded HTML image tags, without the need to use any further information from said server or from said client systems or from an author of said multimedia system; and transmitting said user selected multimedia content with said image scaled to said size directive.

12. The computer readable storage medium of claim 11, further comprising instructions for:

removing said size of each image referenced on said user selected web page.

13. The computer readable storage medium of claim 11, wherein said instruction of searching on a server includes searching for an ASCII key word "img".

14. The computer readable storage medium of claim 13, wherein said instruction of searching on a server includes searching for one of one or more ASCII key words "width" or "height" or "src".

15. The computer readable storage medium of claim 14, wherein said instruction of dynamically scaling said image on said server to said size associated with at least one of said ASCII key words "width" or "height".

* * * * *